United States Patent
Yang

(10) Patent No.: US 10,371,386 B2
(45) Date of Patent: Aug. 6, 2019

(54) COLUMN HEATER WITH IMPROVED HEAT OUTPUT

(71) Applicant: Bond Manufacturing Company, Antioch, CA (US)

(72) Inventor: Eric Yang, Antioch, CA (US)

(73) Assignee: Bond Manufacturing Co., Inc., Antioch, CA (US)

( * ) Notice: Subject to any disclaimer, the term of this patent is extended or adjusted under 35 U.S.C. 154(b) by 676 days.

(21) Appl. No.: 14/825,102

(22) Filed: Aug. 12, 2015

(65) Prior Publication Data
US 2016/0348915 A1    Dec. 1, 2016

Related U.S. Application Data

(60) Provisional application No. 62/168,646, filed on May 29, 2015.

(51) Int. Cl.
*F24C 1/12* (2006.01)

(52) U.S. Cl.
CPC ..................... *F24C 1/12* (2013.01)

(58) Field of Classification Search
CPC .......... F24C 1/12; F23D 14/145; F23D 14/12; F24H 3/0417
USPC ..................................................... 126/92 C
See application file for complete search history.

(56) References Cited

U.S. PATENT DOCUMENTS

| | | |
|---|---|---|
| D429,324 S | 8/2000 | Olson et al. |
| D471,967 S | 3/2003 | Bossler |
| D486,211 S | 2/2004 | Chan et al. |
| D594,949 S | 6/2009 | Wang |
| D620,569 S * | 7/2010 | Hall, Jr. .................. D23/314 |
| D640,355 S * | 6/2011 | Yu .............................. D23/328 |
| D688,360 S | 8/2013 | Paz |
| 8,542,987 B2 * | 9/2013 | Yen ........................... F24H 3/00 |
| | | 126/110 B |
| 8,776,777 B2 * | 7/2014 | Jin ........................... F24C 3/042 |
| | | 126/519 |
| D718,850 S | 12/2014 | Stokke |

(Continued)

FOREIGN PATENT DOCUMENTS

| | | |
|---|---|---|
| AU | 2003 203 464 | 10/2003 |
| CN | 201293393 Y * | 8/2009 |
| FR | 2814223 | 10/2003 |

OTHER PUBLICATIONS

Evenglo image, The Evenglo Edge, Radiant Patio Heater, 1 page, date unknown.

(Continued)

*Primary Examiner* — Jorge A Pereiro
(74) *Attorney, Agent, or Firm* — Weide & Miller, Ltd.

(57) ABSTRACT

A radiant area heater includes a columnar base with a hollow compartment and a heating column disposed on the columnar base. The heating column includes a control portion with at least one controller, a burner, and a sparker and a flame portion that includes a combustion chamber. The combustion chamber is disposed on a cylindrical member that has at least one vent allowing air to circulate to the burner and within the combustion chamber. The heating column further includes at least one heat emitting screen disposed above the flame portion that radiates heat outwards from the heater. A cover is disposed over the heating column to direct heat outwards and away from the heater.

19 Claims, 5 Drawing Sheets

(56) References Cited

U.S. PATENT DOCUMENTS

| | | | | |
|---|---|---|---|---|
| D756,496 S * | 5/2016 | Wang | | D23/332 |
| 9,404,671 B2 * | 8/2016 | Liang | | F24H 9/0073 |
| 2003/0056783 A1 * | 3/2003 | Bossler | | F24C 1/10 |
| | | | | 126/92 AC |
| 2004/0011346 A1 * | 1/2004 | Sakai | | F24C 1/10 |
| | | | | 126/92 AC |
| 2004/0226551 A1 | 11/2004 | Duphily | | |
| 2008/0006263 A1 * | 1/2008 | Seichei | | F24F 3/14 |
| | | | | 126/92 R |
| 2009/0053664 A1 * | 2/2009 | Staller | | F23C 13/08 |
| | | | | 431/328 |
| 2010/0236544 A1 * | 9/2010 | Hall, Jr. | | F23D 14/12 |
| | | | | 126/85 R |
| 2011/0162632 A1 * | 7/2011 | DiVentura | | F23D 14/14 |
| | | | | 126/58 |
| 2013/0014748 A1 * | 1/2013 | Jin | | F24C 3/042 |
| | | | | 126/91 A |
| 2014/0220293 A1 | 8/2014 | Lavigna et al. | | |
| 2014/0305427 A1 * | 10/2014 | Liang | | F24H 3/006 |
| | | | | 126/90 R |
| 2014/0305428 A1 * | 10/2014 | Liang | | F24H 9/0073 |
| | | | | 126/91 A |
| 2015/0253036 A1 * | 9/2015 | Wang | | F24H 1/06 |
| | | | | 126/91 A |
| 2016/0131394 A1 * | 5/2016 | Liang | | F23D 14/82 |
| | | | | 126/90 R |
| 2016/0230985 A1 * | 8/2016 | Home | | F23D 14/145 |
| 2017/0167724 A1 * | 6/2017 | Wang | | F23D 14/70 |

OTHER PUBLICATIONS

Gasmate Catalog, Gasmate, the outdoors made easy, Heating & Lighting, www.gasmate.co.nz, 2013-2014, 20 pages.
Home Depot Catalog, http://www.homedepot.com/catalog/productImages/400/3f/3f384a39-69ea-4eb4-9-caa-bd9d, 1 page, printed Nov. 4, 2015.
Square image, Square, https://secure.img1.wfrcdn.com/1f/87/hash/1523/3972126/1/Square%2BFlame%2BHeater, 1 page, printed Nov. 4, 2015.

* cited by examiner

COLUMN HEATER WITH IMPROVED HEAT OUTPUT

CROSS REFERENCE TO RELATED APPLICATION

This application claims the benefit of and priority to U.S. Provisional Application No. 62/168,646 which was filed May 29, 2015, the contents of which are hereby incorporated by reference.

BACKGROUND

1. Field

The disclosed embodiments relate to heating apparatuses. More specifically, the disclosed embodiments relate to area heaters, such as outdoor patio heaters.

2. Related Art

Many people enjoy sitting, eating, and socializing in outdoor settings. In such settings, people may enjoy fresh air, natural light, and/or the ambience of the community or other surroundings. Accordingly, many restaurants include outdoor seating as an option for their customers. Homeowners may also utilize outdoor furniture on a patio, porch, or deck to enjoy time outside alone or with others.

However, many climates have at least a portion of the year where temperatures are generally too cold to allow people to comfortably sit outside. Additionally, even during warmer months, evenings or nights may become sufficiently cool that people no longer wish to remain outdoors. For a restaurant, this may result in being unable to utilize an outdoor eating area. For a homeowner, this may limit the homeowner's use and enjoyment of his or her patio or deck.

Because of this, patio heaters have been developed to provide heat to outdoor areas to allow people to comfortably remain outdoors even when the outside temperature cools. Typical patio heaters provide radiant heat to an area surrounding the heater. Such patio heaters may use an electrical heating element or a natural gas burner with a radiant heat emitter screen.

While such patio heaters provide radiant heat, they are not always aesthetically pleasing. In fact, many people would prefer a heater that incorporates a natural looking flame. The ambience created by a natural looking flame is thought to increase the overall ambience of the surroundings. Furthermore, during evening or night hours, the flame provides a warm, ambient light.

As a result, patio heaters have been developed to incorporate a natural looking flame. However, such patio heaters have been found to have a number of drawbacks. Such patio heaters, while utilizing a flame, do not produce as much heat output as traditional radiant heaters. As a result, a user of such a patio heater would need to invest in more natural flame patio heaters and would spend more money in the resulting fuel required to operate the heaters.

SUMMARY

In light of the above, the disclosed embodiments have been developed to provide an area heater such as patio heater utilizing a natural flame visible to users while maintaining a high heat output. In one such embodiment, a radiant area heater includes a columnar base with a hollow compartment and a heating column disposed on the columnar base. The heating column includes a control portion with at least one controller, a burner, and a sparker, and a flame portion that includes a combustion chamber. The combustion chamber is disposed on a cylindrical member that has at least one vent allowing air to circulate to the burner and within the combustion chamber. The heating column further includes at least one heat emitting screen disposed above the flame portion that radiates heat outwards from the heater. A cover is disposed over the heating column to direct heat outwards and away from the heater.

In some embodiments, the radiant area heater may include a base flange disposed at a bottom of the columnar base. The base flange may include at least one wheel allowing the heater to be easily moved. The columnar base may also include a removable panel allowing access to the hollow compartment. The removable panel may be a door attached to the columnar base via hinges. The door may be releasably secured in a closed position by a latch. The removable panel may include at least one air ventilation hole.

In other embodiments, the at least one heat emitting screen may include an upper heat emitting screen and a lower heat emitting screen. The upper heat emitting screen may be configured with a width that is greater than a width of the lower heat emitting screen. In some instances, the width of the lower heat emitting screen is substantially equal to a width of the combustion chamber. The width of the combustion chamber may be configured to be at least 200 mm.

The radiant area heater may further include a wire cage disposed around the flame portion and the at least on heat emitting screen. The columnar base and heating column may be configured to be cylindrical in shape.

In some embodiments, there a radiant area heater may include a cylindrical columnar base. The columnar base may include a base flange at a bottom of the columnar base, the base flange having at least one wheel to allow a user to move the area heater. The columnar base may further include a hollow compartment configured to house a fuel tank therein. A middle flange may be disposed above the columnar base.

The area heater may further include a cylindrical control portion that has at least one controller, a burner, and a sparker. A cylindrical flame portion may be disposed above the middle flange. The flame portion may include a transparent cylindrical combustion chamber disposed above said burner. The combustion chamber may be held and supported by a cylindrical supporting member. The cylindrical supporting member may include at least one vent allowing air to circulate to the burner and within the combustion chamber.

At least one heat emitting screen may be disposed above of the combustion chamber. A wire cage may be provided to surround the combustion chamber and the at least one heat emitting screen. A cover may be disposed above the at least one heat emitting screen in order to direct heat outward from the heater.

In some embodiments, the at least one heat emitting screen comprises an upper heat emitting screen and a lower heat emitting screen. The upper heat emitting screen may have a diameter that is greater than a diameter of the lower heat emitting screen. The diameter of the lower heat emitting screen may be substantially equal to a diameter of the combustion chamber. The diameter of the combustion chamber may be at least 200 mm.

In other embodiments, the middle flange may include a handle to facilitate the transportation of the area heater. The control portion may also include a pilot light to light the burner. In some instances, at least a portion of the wire cage may be removable.

Also disclosed is a column heater comprising a base configured to support the heater with a burner located in or above the base. The burner is in gaseous communication with a source of combustible gas. A combustion area extends upward from the base and is located above the burner. The combustion area has a cross sectional area of greater than 706 square centimeters. Also part of this embodiment are air vents adjacent or below the combustion area such that the air vents have an area greater than an area of the burner to allow air flow into the combustion area to complete combustion of the combustible gas. A top cover above the combustion area is configured to radiate heat downward and outward.

This embodiment may further comprise one or more radiant heating screen located above the combustion area such that the one or more radiant heating screens are configured to receive heat rising from the combustion chamber and radiate the heat outward from the heater.

The one or more radiant heating screens may comprise an upper screen and a lower screen such that the upper screen having a diameter that is greater than the lower screen. The combustion area maybe enclosed in a transparent or semi-transparent enclosure. It is contemplated that the combustion area may be configured to present flame from the burner, the flame having a height of greater than 60 centimeters. In one embodiment the base is round to increase stability and the combustion chamber is round to thereby provide equivalent heat output at all radial locations along a fixed radius outward from the heater.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

Figure 1:
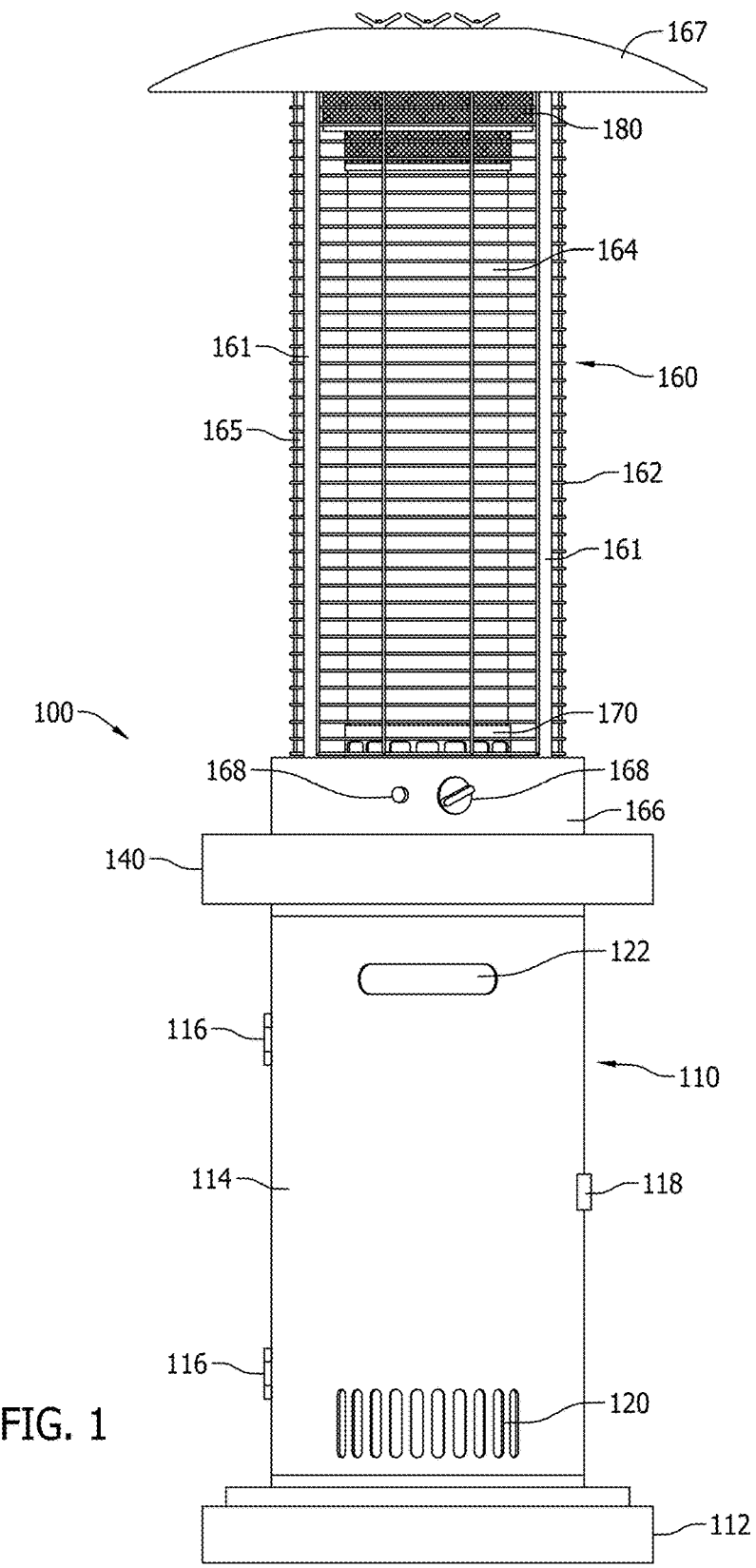
FIG. 1 is a front view of an area heater according to one exemplary embodiment.
Figure 2:
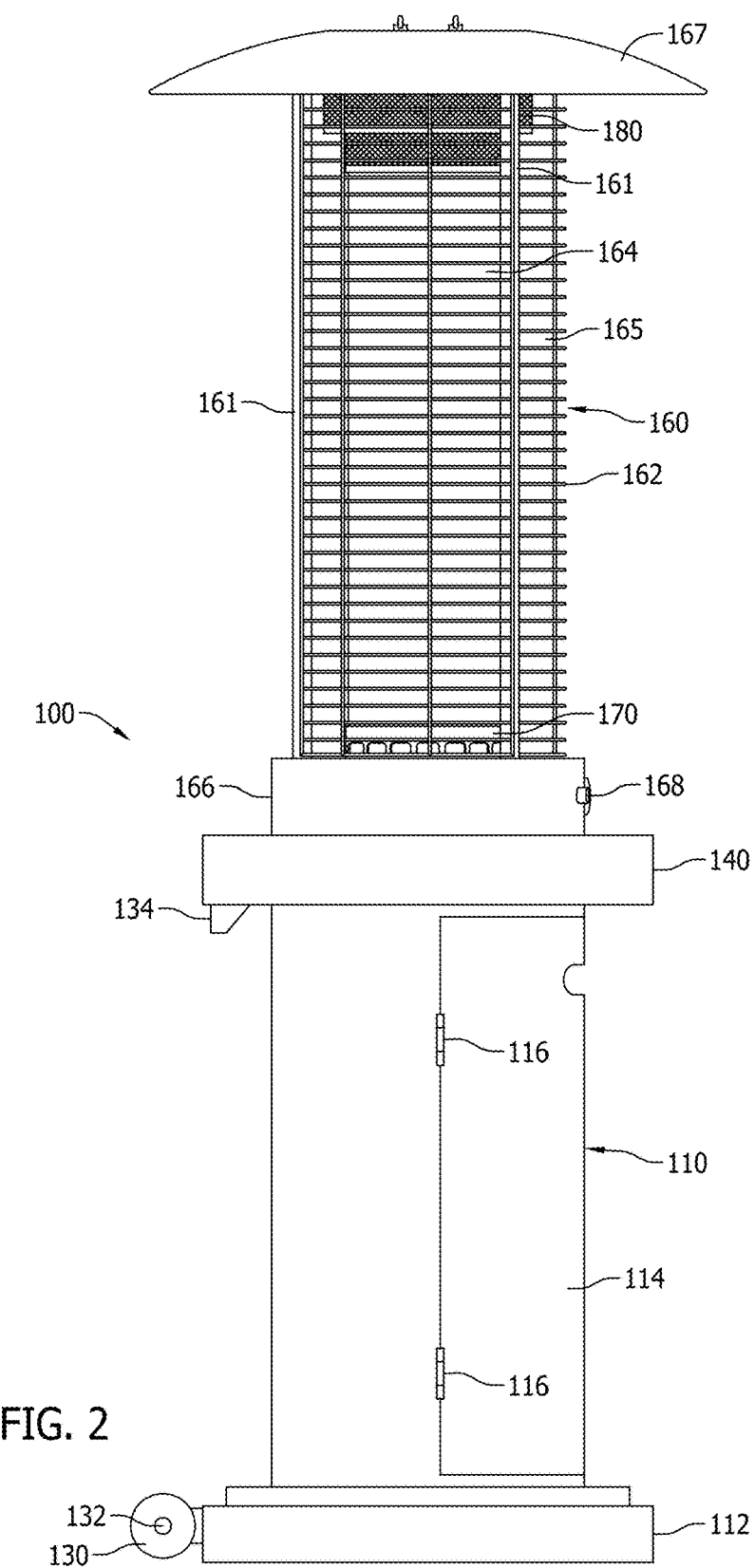
FIG. 2 is a side view of the area heater shown in FIG. 1.

FIG. 1 is a front view of an area heater according to one exemplary embodiment, and FIG. 2 is a side view of the area heater shown in FIG. 1. In this embodiment, a radiant induction area heater 100 includes a columnar base 110 on which a heating column 160 sits. The columnar base 110 may be formed of a flame resistant material such as a metal, ceramic, composite, and the like. The columnar base 110 may be configured with a decorative exterior, such as to resemble bricks, stone, or any other decorative motif.

In one embodiment, the columnar base 110 includes a base flange 112. The base flange 112 has a diameter that extends beyond the diameter of the columnar base 110 and provides stability to the overall structure of the heater 100 as it sits on a surface. An axle 132 and pair of wheels 130 may be mounted to the base flange 112 to allow for easy transportation of the heater 100. The wheels 130 may be configured to be raised slightly from the ground when the heater 100 rests flat on a surface. In this way, the wheels 130 only allow movement of the heater 100 when the heater 100 is tilted back at an angle allowing the wheels 130 to come in contact with the ground.

The columnar base 110 further defines a hollow compartment 115 (see FIG. 3) within its cylindrical wall. To access the compartment 115, the columnar base 110 has a removable panel or door 114. The panel or door 114 may be removable via any suitable manner. For example, the door 114 may rotate via hinges 116 between open and closed positions. In order to hold the door 114 closed during use, the door 114 may be latched via a latch 118.

The door 114 may include ventilation holes 120 to allow air to circulate within the compartment 115. The door 114 may also include an access hole 122 that facilitates the opening and closing of the door 114. In other embodiments, a handle may be used in place of the access hole 122. However, the access hole 122 provides additional ventilation to the compartment 115.

Above the columnar base 110, as shown in FIGS. 1 and 2, a middle flange 140 is provided. The middle flange 140 provides additional structural support to the heater 100 while also aesthetically matching with the base flange 112. The middle flange 140 may optionally include a handle 134. The handle 134 allows a user to easily hold the heater 100 and tilt it back on its wheels 130, thereby easily moving the heater to another location.

The heating column 160 is disposed above the middle flange 140. The heating column 160 includes a control portion 166, a flame portion 165, and a screen portion 180. The control portion 166 comprises a number of controls 168. In this embodiment, the controls 168 may include a starter controller and a fuel valve controller. The starter controller may control a sparker (described below). The controls 168 allow a user to turn the heater 100 on and off and to control the amount of heat emitted from the heater 100.

The flame portion 165 includes one or more vertical support members 161 supporting a wire cage 162. The wire cage 162 is provided to prevent persons around the heater 100 from getting too close to the heat source of the heater 100. The support member 161 and wire cage 162 may be formed from any suitable flame resistant material such as metals or composites. The wire cage 162 may be configured to be at least partially removable. For example, the wire cage 162 may be sectioned between the support members 161. One or more sections of the wire cage 162 between the support members 161 may be configured to be removed to allow access into the wire cage 162 for cleaning and maintenance.

The wire cage 162 and support members 161 surround a transparent combustion chamber 164. In this embodiment, the combustion chamber 164 is formed in a cylindrical or tubular shape. The transparent combustion chamber is constructed from a flame and heat resistant material. For example, the transparent combustion chamber 164 may be formed from a tempered glass, borosilicate glass, a high temperature, transparent polymer, or the like.

The combustion chamber 164 is supported by a cylindrical member 170 disposed on top of the control portion 166. The screen portion 180 is configured to be disposed above the heating chamber 164. The screen portion 180 is described in more detail below. The heater 100 also includes a top cover 167. The top cover 167 may be metallic and is configured to radiate heat outwards and away from the heater 100 to heat the surrounding area.

Figure 3:
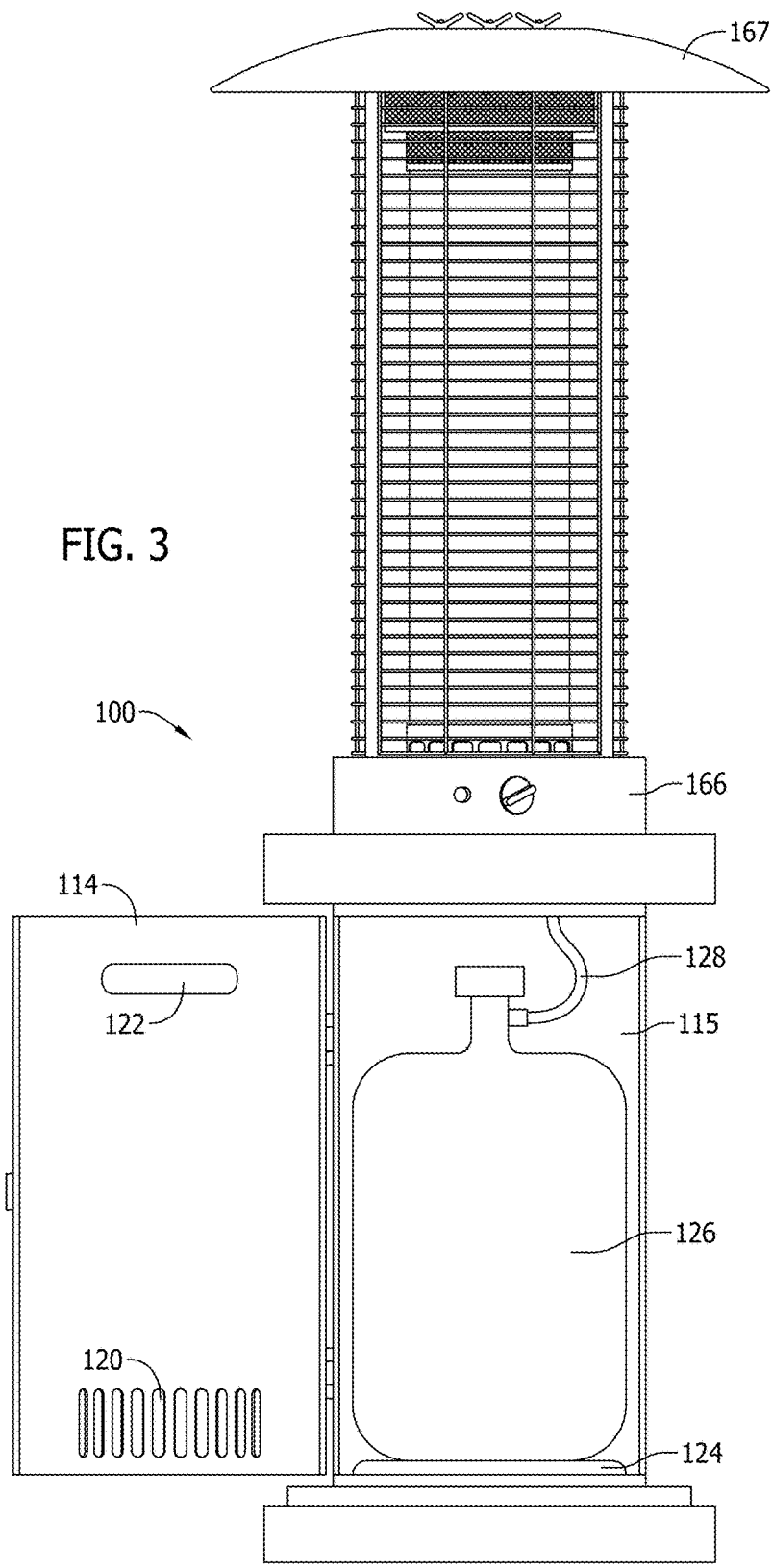
FIG. 3 is a front view of the area heater shown in FIG. 1 which shows a door to a compartment in the open position.

FIG. 3 is a front view of the area heater shown in FIG. 1 in which a door to a compartment is in the open position. In this embodiment, when the door 114 is in the open position, a fuel tank 126 may be accessed within the compartment 115. For example, an empty fuel tank 126 may be removed and replaced with a full fuel tank 126 when the door 114 is in the open position. The compartment 115 includes a fuel tank base 124 which supports the fuel tank 126 and holds the fuel tank 126 in position. A fuel line 128 may extend from the control portion 166 of the heater 100 into the compartment 115 to attach to the fuel tank 126.

Figure 4:
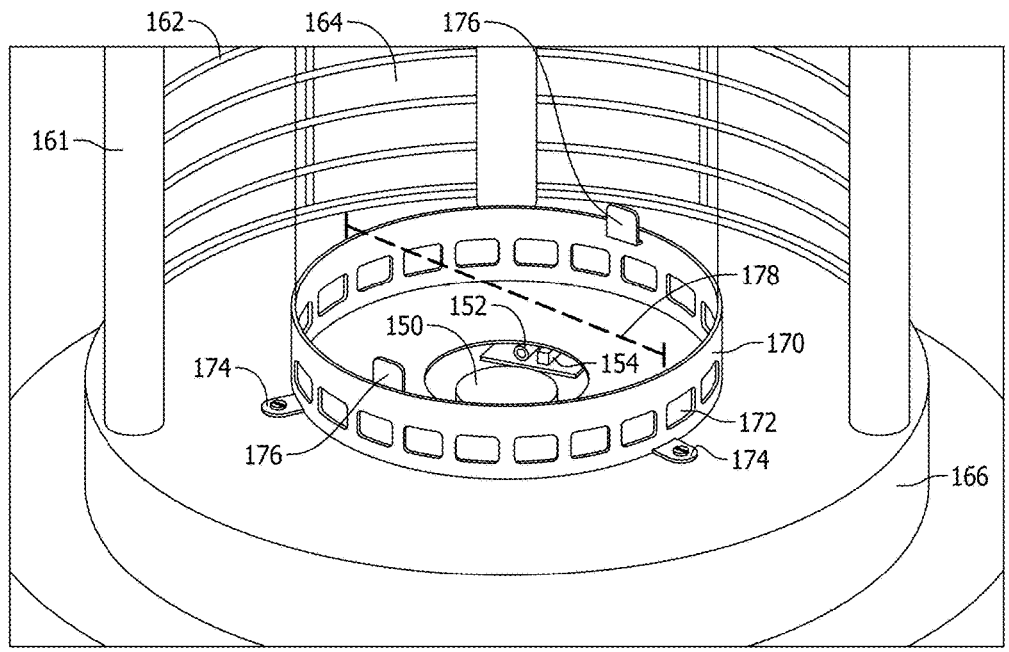
FIG. 4 is an enlarged perspective view of a burner of the area heater shown in FIG. 1.

FIG. 4 is an enlarged perspective view of a burner of the area heater shown in FIG. 1. As shown in FIG. 4, a portion of the wire cage 162 between two supports 161 is may be removed to allow access within the wire cage 162, as described above. In FIG. 4, a portion of the wire cage 162 is shown as removed for ease in explanation. In this embodiment, the cylindrical member 170 includes a plurality of brackets 176. The combustion chamber 164 is configured to rest on the brackets 176 of the cylindrical member 170. The cylindrical member 170 further comprises mounting brackets 174 which securely affix the cylindrical member 170 to the control portion 166.

A plurality of ventilation holes 172 are formed in the cylindrical body 170. In this embodiment, the ventilation holes 172 extend in an array around the entire circumference of the cylindrical body 170. The ventilation holes 172 provide air circulation to enhance the combustion in the combustion chamber 164.

As seen in FIG. 4, the control portion 166 includes a burner 150. The burner 150 may be ignited by a pilot light 152. Both the burner 150 and pilot light 152 may burn fuel provided from the fuel tank 126 via the fuel line 128 (see FIG. 3). To conserve fuel, the pilot light 152 may be configured to remain unlit during a period of storage. The control portion 166 may thus also include a sparker 154 that provides a spark in response to the controls 168 to light the pilot light 152.

The flame emitted from the burner 150 is enhanced by the ventilation built into the heater 100. This ventilation comes from the ventilation holes 120 and access hole 122 in the door 114, as well as the array of vents 172 in the cylindrical member 170. The combustion chamber 164 is further configured to be sufficiently wide to allow for enhanced combustion as compared to typical flame heaters. In one embodiment, a diameter 178 of the combustion chamber 164 is at least 150 mm. In some embodiments, the diameter 178 is at least 200 mm. In further embodiments, the diameter 178 is at least 250 mm. The width of the combustion chamber 164 also allows the flames within the combustion chamber to be wider than typical flame heaters. This allows the flame to have a natural look, increasing the aesthetics of the heater 100.

Figure 5:
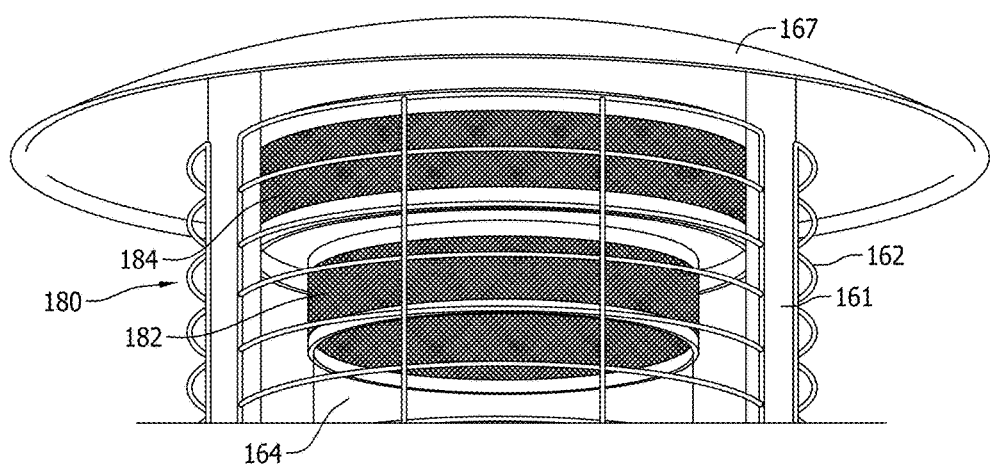
FIG. 5 is an enlarged perspective view of a heat emitting screen portion of the area heater shown in FIG. 1.

FIG. 5 is an enlarged perspective view of a heat emitting screen portion of the heater shown in FIG. 1. In this embodiment, the screen portion 180 comprises a lower heat emitting screen 182 and an upper heat emitting screen 184. The lower heat emitting screen 182 is disposed above the combustion chamber 164. The lower heat emitting screen 182 has a diameter substantially equal to the combustion chamber 164. Flames from the burner 150 heat the lower heat emitting screen 182 such that the screen 182 emits and radiates heat outward, as directed by the cover 167.

The upper heat emitting screen 184 is disposed above the lower heat emitting screen 182. The upper heat emitting screen 184 is configured to have a diameter that is greater than the lower heat emitting screen 182 and the combustion chamber 164. The upper heat emitting screen 184 acts as a secondary heat emitting screen to absorb heat from the flames of the burner 150 that are not absorbed by the lower heat emitting screen 182. Similar to the lower heat emitting screen 182, the upper heat emitting screen 184 radiates heat outward as directed by the cover 167.

Figure 6:
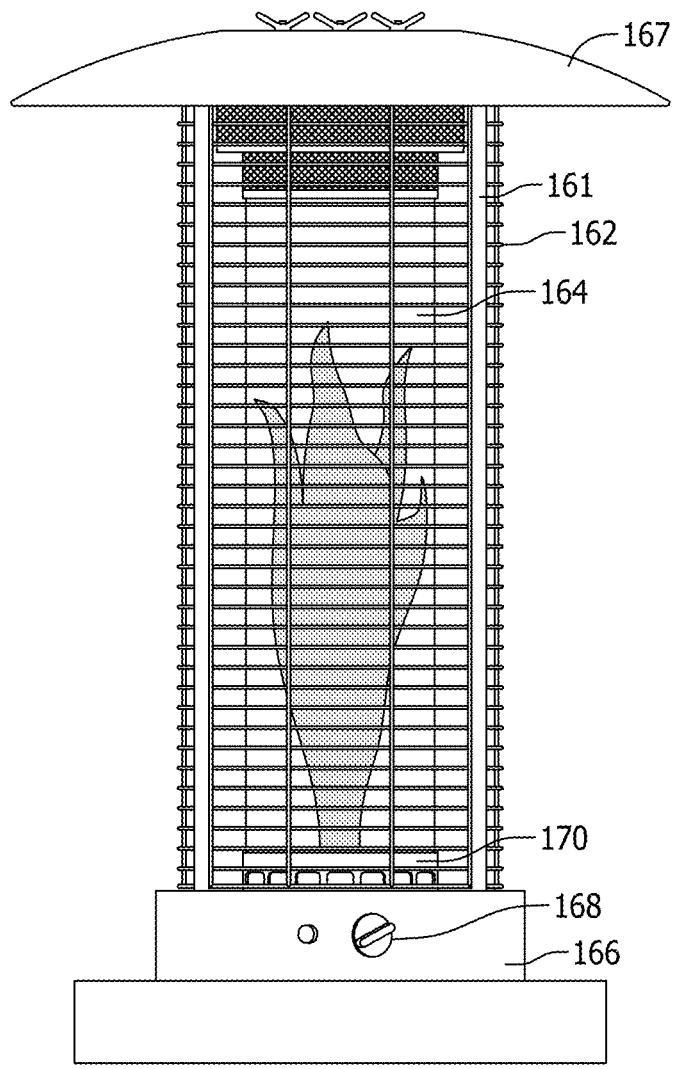
FIG. 6 is a view of the area heater shown in FIG. 1 in operation, according to an exemplary embodiment.

FIG. 6 is a view of the area heater shown in FIG. 1 in operation, according to an exemplary embodiment. In order to operate the heater 100, a user operates the controls 168 to light the pilot light 152 with the sparker 154, which in turn lights the burner 150. The user can control the amount of fuel flowing to the burner 150 via the controls 168, thereby controlling the amount of heat emitted by the heater 100.

The burner 150 emits a flame up through the combustion chamber 164. The combustion is enhanced by the cylindrical member 170 supporting the combustion chamber 164 and providing air circulation via the vents 172. The flames extend through the combustion chamber 164 providing a desirable ambience due to the visible flames. Heat radiates outward from the flames through the transparent combustion chamber 164 and wire cage 162 to heat the surroundings. In addition, heat and hot gases rising from the flames through the combustion chamber 164 heat the lower and upper heat emitting screens 182, 184 which radiate additional heat towards the surrounding area.

In on embodiment the wire screen that surrounds the combustion chamber is make with numerous open sections in relation the wire that forms the screen. By increasing the size of the openings in the wire screen that surrounds the combustion area or chamber, more heat can radiate outward from the heater, thereby increasing the efficiency of each output for a given amount of fuel. In one embodiment the opening are at least ½ inch by 1 inch. In another embodiment the openings are at least ½ inch by 1½ inch. In one embodiment, the openings are at least ¾ inch by 1 inch. In other embodiment the size of the openings may vary, but be greater than the prior art heaters.

As a further advantage to the present design over the prior art heaters, the amount of air provided to the combustion chamber and the combustion chamber itself is increased. Based on extensive research by the inventors it was discovered that prior art heaters lacked sufficient airflow to complete combustion. As disclosed herein, the area of the air vents around the burner (below, on the side, or both) is increased as compared to the prior art. In one embodiment, the area for air to enter the combustion chamber is greater than the area of the burner. In one embodiment, the area for air to enter the combustion chamber is greater than 1.5 times the area of the burner.

Other modifications of the above described embodiments may also be implemented. For example, while the general shape of the heater described above is cylindrical, the heater may be configured to be square, rectangular, elliptical, or to be another shape. Further, in place of a fuel storage tank, the heater may have a port to hook up to an external fuel supply.

The above described embodiments provide a number of advantages. Because the heater incorporates visible flames, the overall look and feel of the heater is enhanced. That is, people enjoy the light and the look that is created by flames.

Further, because of the enhanced ventilation and design of the heater, the performance of the heater is better than traditional flame heaters, as demonstrated in the following example.

EXAMPLE 1

A heater according to the above embodiments was tested for performance against a traditional gas powered radiant heater and a known flame radiant heater. For each heater tested, temperature was measured at distinct distances away from the heater to determine the heat emitted from each heater. Each heater in the test was configured to consume 46,000 BTU. The results of the test are shown in Table 1.

|  | Measurement point (inches) | | | | | | | | |
| --- | --- | --- | --- | --- | --- | --- | --- | --- | --- |
|  | 19.7 | 25.6 | 31.5 | 37.4 | 43.3 | 49.2 | 55.1 | 61.0 | 66.9 |
| Traditional Radiant Heater (° F.) | 131.4 | 124.9 | 124.2 | 113.9 | 112.8 | 109.8 | 105.4 | 100.8 | 100.6 |
| Traditional Flame Heater (° F.) | 116.8 | 113.0 | 109.6 | 107.1 | 104.9 | 103.6 | 102.7 | 101.8 | 100.4 |
| Rapid Induction Area Heater (° F.) | 142.7 | 129.9 | 120.6 | 116.2 | 113.9 | 110.7 | 102.0 | 102.0 | 101.7 |

As shown from the above results, the rapid induction area heater has a performance that is similar to traditional radiant heaters while also incorporating a design with a visible flame. In comparison with traditional flame heaters, the performance of the rapid induction area heater as described in the above embodiments is significantly higher than the traditional flame heaters at a radial distance of closer than six feet. Thus, the heater in the disclosed embodiments can provide performance similar to a non-flame radiant heater while providing the ambience desired from a traditional flame heater.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A radiant area heater comprising:
  a columnar base that includes a hollow compartment;
  a heating column disposed on the columnar base, the heating column comprising:
    a control portion that comprises at least one controller, a burner, and a sparker;
    a flame portion that comprises a combustion chamber, the combustion chamber being disposed on a cylindrical member, the cylindrical member comprising at least one vent allowing air to circulate to the burner and within the combustion chamber; and
    an upper heat emitting screen and a lower heat emitting screen disposed above the flame portion, the upper heat emitting screen and the lower heat emitting screen radiating heat outwards from the heater, the upper heat emitting screen having a width that is greater than a width of the lower heat emitting screen;
  a wire cage disposed to surround the combustion chamber, the upper heat emitting screen and the lower heat emitting screen; and
  a cover disposed over the heating column, the cover being configured to direct heat outwards and away from the heater.

2. The radiant area heater according to claim 1, further comprising a base flange disposed at a bottom of the columnar base, the base flange comprising at least one wheel.

3. The radiant area heater according to claim 1, wherein the columnar base comprises a removable panel allowing access to the hollow compartment.

4. The radiant area heater according to claim 3, wherein the removable panel is a door attached to the columnar base via hinges, the door being releasably secured in a closed position by a latch.

5. The radiant area heater according to claim 3, wherein the removable panel comprises at least one air ventilation hole.

6. The radiant area heater according to claim 1, wherein the width of the lower heat emitting screen is equal to a width of the combustion chamber.

7. The radiant area heater according to claim 1, wherein a width of the combustion chamber is at least 200 mm.

8. The radiant area heater according to claim 1, wherein the columnar base and heating column are cylindrical in shape.

9. A radiant area heater comprising:
  a cylindrical columnar base, the columnar base comprising:
    a base flange at a bottom of the columnar base, the base flange comprising at least one wheel; and
    a hollow compartment configured to house a fuel tank therein;
  a middle flange disposed above the columnar base;
  a cylindrical control portion, the control portion comprising at least one controller, a burner, and a sparker;
  a cylindrical flame portion disposed above the middle flange, the flame portion comprising:
    a transparent cylindrical combustion chamber disposed above said burner;
    a cylindrical supporting member configured to hold the combustion chamber, the supporting member comprising at least one vent allowing air to circulate to the burner and within the combustion chamber;
  an upper heat emitting screen and a lower heat emitting screen disposed above of the combustion chamber, the upper heat emitting screen having a diameter that is greater than a diameter of the lower heat emitting screen;
  a wire cage disposed to surround the combustion chamber and the upper heat emitting screen and the lower heat emitting screen; and
  a cover disposed above the upper heat emitting screen and the lower heat emitting screen, the cover configured to direct heat outward from the heater.

10. The radiant area heater according to claim 9, wherein the diameter of the lower heat emitting screen is equal to a diameter of the combustion chamber.

11. The radiant area heater according to claim 9, wherein a diameter of the combustion chamber is at least 200 mm.

12. The radiant area heater according to claim 9, wherein the middle flange comprises a handle.

13. The radiant area heater according to claim 9, wherein the control portion further comprises a pilot light.

14. The radiant area heater according to claim 9, wherein at least a portion of the wire cage is removable.

15. A heater comprising:
a base configured to support the heater; a burner located in or above the base, the burner in gaseous communication with a source of combustible gas;
a combustion area extending upward from the base and located above the burner, the combustion area having cross sectional area of greater than 706 square centimeters;
air vents adjacent or below the combustion area, the air vents having an area greater than an area of the burner to allow air flow into the combustion area to complete combustion of the combustible gas;
an upper heat emitting screen and a lower heat emitting screen disposed above the combustion area, the upper heat emitting screen having a width that is greater than a width of the lower heat emitting screen; and
a top cover above the combustion area configured radiate heat downward and outward;
further comprising a wire cage disposed to surround the combustion area, the upper heat emitting screen, and the lower heat emitting screen.

16. The heater of claim 15, wherein the upper heat emitting screen and the lower heat emitting screen are configured to receive heat rising from the combustion chamber and radiate the heat outward from the heater.

17. The heater of claim 15, wherein combustion area is enclosed in a transparent or semi-transparent enclosure.

18. The heater of claim 15, wherein the combustion area is configured to present flame from the burner, the flame having a height of greater than 60 centimeters.

19. The heater of claim 15, wherein the base is cylindrical, and the combustion chamber is cylindrical to provide equivalent heat output at all radial locations along a fixed radius outward from the heater.

* * * * *